United States Patent [19]

Feuerlein et al.

[11] Patent Number: 5,316,164
[45] Date of Patent: May 31, 1994

[54] HOUSING SUITABLE FOR WALL OR BOTTOM FASTENING

[75] Inventors: Friedrich Feuerlein; Helmut Müller, both of Nürnberg, Fed. Rep. of Germany

[73] Assignee: Metrawatt GmbH, Nürnberg, Fed. Rep. of Germany

[21] Appl. No.: 930,175

[22] Filed: Aug. 17, 1992

[30] Foreign Application Priority Data

Aug. 17, 1991 [DE] Fed. Rep. of Germany ....... 4127253

[51] Int. Cl.⁵ ............................................. B65D 25/24
[52] U.S. Cl. ..................................... 220/3.2; 220/481
[58] Field of Search .......................... 220/3.2, 480, 481

[56] References Cited

U.S. PATENT DOCUMENTS

| 2,754,991 | 7/1956 | Hagerty et al. | 220/481 |
| 3,432,061 | 3/1969 | Anderson | 220/481 |
| 3,526,314 | 9/1970 | Trammell, Jr. | 220/481 |
| 3,897,883 | 8/1975 | Cederstrom | 220/481 |
| 3,983,976 | 10/1976 | Taylor | 220/481 |

FOREIGN PATENT DOCUMENTS

1303645 1/1973 United Kingdom ................ 220/481

Primary Examiner—Joseph Man-Fu Moy
Attorney, Agent, or Firm—Herbert L. Lerner; Laurence A. Greenberg

[57] ABSTRACT

A housing for equipment in electrical systems, which is suitable for fastening to a wall or bottom surface, includes a substantially parallelepiped housing body. A bottom part is secured to the housing body and has an outer surface. A replaceable or interchangeable fastening adaptor is adapted to an intended type of wall or bottom fastening. Retaining elements, which are preferably of the same material, are formed on the outer surface of the bottom part for enabling the fastening adaptor to be slipped on.

26 Claims, 9 Drawing Sheets

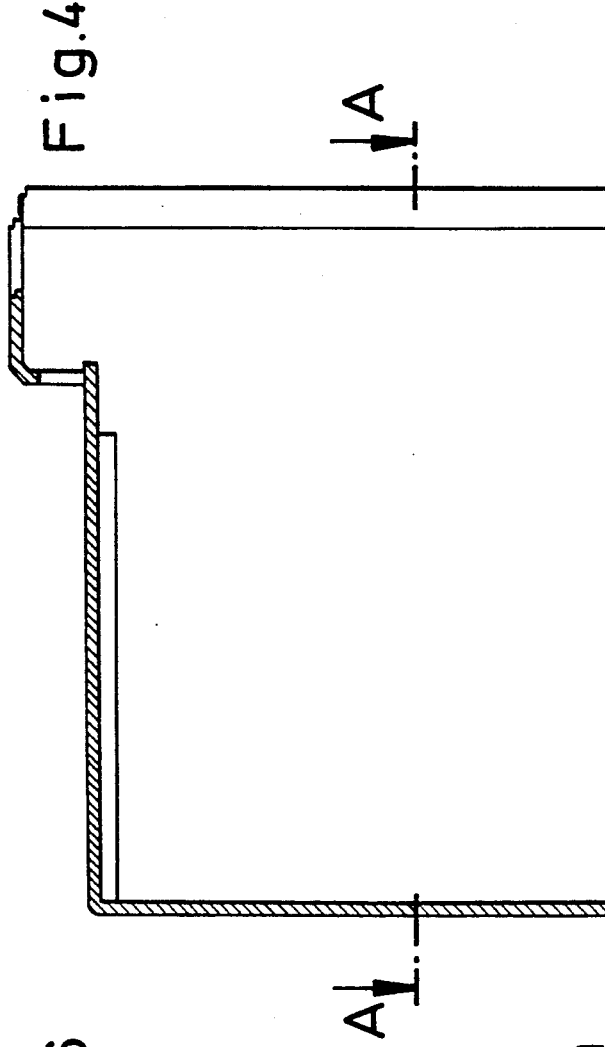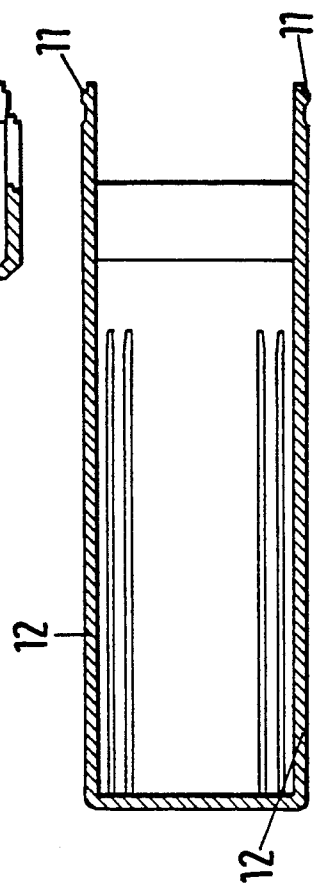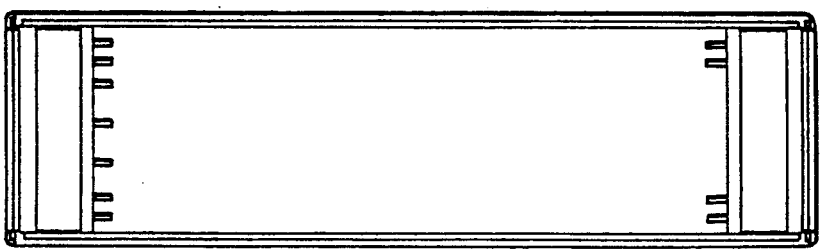

2a = 2b
Fig.7
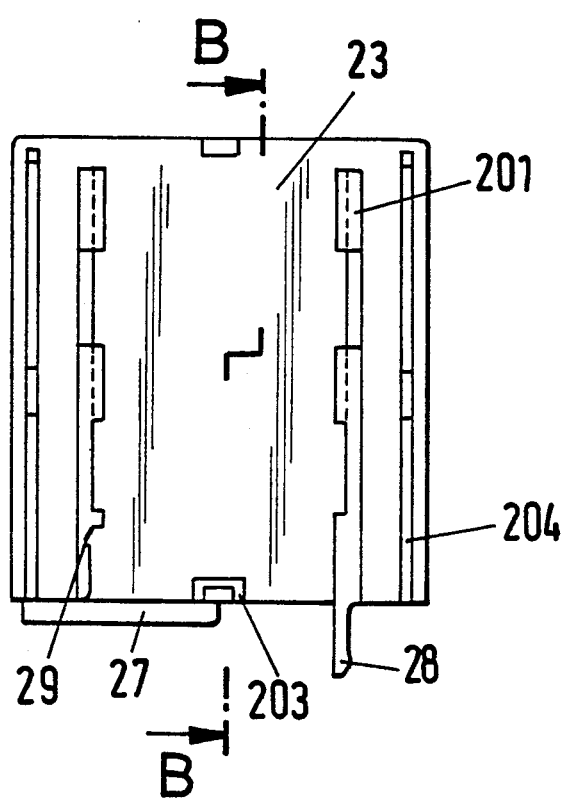
Fig.9
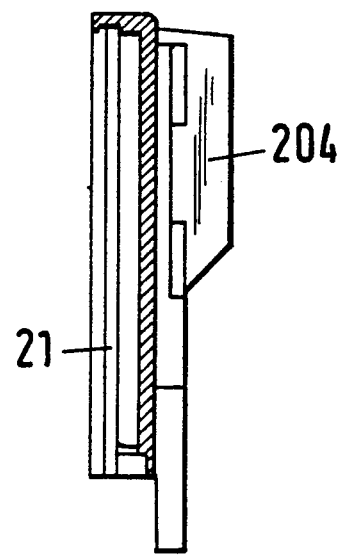
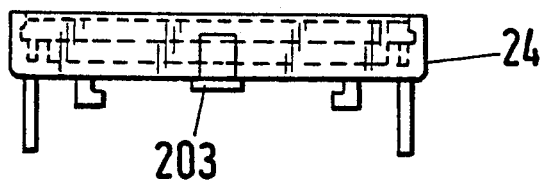
Fig.8

HOUSING SUITABLE FOR WALL OR BOTTOM FASTENING

The invention relates to a housing for equipment in electrical systems that is suited for fastening to a wall or a bottom surface, having a substantially parallelepiped housing body and a bottom part secured to the housing body.

In order to provide wall fastenings of housings, such as for measuring transducers or switchgear, profile rails that are mounted on a wall surface are preferentially used, and the housings can be mounted on the rails with the aid of a clamping apparatus. As a rule, clamp elements belonging to the clamping apparatus are secured in the bottom part of such housings and engage the profile rail in tonglike fashion, with spring means assuring the necessary tong forces.

Despite the dominance of certain profile rails, particularly those known as top hat rails, one goal of equipment manufacturers is to allow the user to continue to use fastening options that may even be obsolete. However, in order to provide adaptation to the desired type of fastening with known equipment, either a completely different housing would have to be used, or the bottom plate of the housing that is provided with the specific fastening parts would have to be replaced.

It is accordingly an object of the invention to provide a housing suitable for wall or bottom fastening, which overcomes the hereinafore-mentioned disadvantages of the heretofore-known devices of this general type and which can be adapted as simply as possible to existing fastening possibilities, for example in an electrical system.

With the foregoing and other objects in view there is provided, in accordance with the invention, an electrical system equipment housing for suitable fastening to a wall or bottom surface, comprising a substantially parallelepiped housing body, a bottom part being secured to the housing body and having an outer surface, a replaceable or interchangeable fastening adaptor being adapted to an intended type of wall or bottom fastening, and retaining elements, preferably of the same material, formed on the outer surface of the bottom part for enabling the fastening adaptor to be slipped on.

According to the invention, the goal of simplified adaptation to various fastening options is attained with the aid of an interchangeable fastening adaptor, which is adapted to the type of wall or bottom fastening intended and can easily be mounted on the housing. This makes it possible to construct the housing, including its bottom plate, completely independently of the way in which it will be fastened later, and also to put the entire piece of equipment on consignment or in inventory and leave the selection of the fastening apparatus to later. A later change, for instance in converting a system, still presents no problems because the correct adaptor merely needs be procured.

According to a suitable feature of the invention, the bottom part holding the fastening adaptor can be slipped onto the housing body from at least one side. To that end, intermeshing slide rails and slide grooves are respectively provided on the housing body and on the bottom part. As a result, very simple, fast opening and closing of the housing is attained without means for screwing them together.

It is especially advantageous if the bottom part includes two bottom halves, that are preferably constructed identically, which can be slipped onto the housing body from two opposite sides and which meet one another with their abutting edges in the middle of the housing.

To this end, the bottom part preferably has the form or shape of a flat shell, which is open on one side for being slipped on, because of its separation into the two bottom halves. The slide elements that are needed in any case for slipping on the two bottom halves act as a meandering seal, so that the housing is also well-protected against dust.

Two additional guide rails disposed on the bottom halves parallel to the two housing side walls in the sliding direction, form a running groove for the ends of the housing walls engaging them there, and assure adequate lateral stability of the housing walls.

In order to achieve good sealing from the outside in the region of the abutting edge of the two bottom halves as well, each bottom wall is provided in the region of its abutting edge with an overlapping tongue, which has half the width and half the wall thickness of the remaining bottom wall and is offset in stages in such a way that two overlapping tongues that meet, which are halved in their wall thickness, add together by overlapping to make the wall thickness of the remaining bottom wall.

A secure connection of the two bottom halves to make a common bottom part is attained by providing one detent hook and one detent bearing surface anchoring the detent hooks, each being disposed in the region of a respective abutting edge, the detent elements interlocking when the two bottom halves meet.

In order to attain a secure connection of the fastening adaptor to the bottom part, retaining tangs are formed onto the outside of the bottom halves along their sliding direction, and retaining grooves are located between these tangs and the bottom wall. Slide cams, which are formed onto a rail holder and belong to a fastening adaptor, fit into these retaining grooves.

Convenient mounting of the fastening adaptor on the bottom part is achieved due to the fact that the retaining tangs and the slide cams are each disposed at such a distance from one another that the slide cams find space between the retaining tangs, so that the two intermesh in toothlike fashion, and the slide cams can slide inside the retaining grooves up to a stop by a short displacement parallel to the plane of the bottom wall.

Locking of the fastening adaptor to the bottom part is attained with the aid of a spring tab that is exposed in a base plate of the rail holder by a recess. The spring tab has an indentation, into which retaining cams dip, each retaining cam being formed onto a respective bottom half in the region of the abutting edge and protruding past the plane of the bottom wall. Since the indentation engages both retaining cams, the two bottom halves are simultaneously held together as well.

According to a further feature of the invention, an especially advantageous clamping apparatus for top hat rail fastening is created. To this end, two guide strips located in the sliding direction are disposed on each of the two ends on the outer surface or outside of the base plate of the rail holder facing away from the housing. These guide strips are bent toward the inside and with the base plate they form two opposed guide grooves, which serve to receive one clamp part and one locking part.

The clamp part serves the purpose of detachable fastening the housing to a profile rail, in such a manner that two clamp parts engage the profile rail on both sides in the manner of tongs. The clamp parts are held in their clamping position by spring force, and they can be displaced into an opening position, counter to the action of this spring force, for release. The locking part is joined to the clamp part in such a way that the two parts are displaceable toward one another and relative to the rail holder, and that they can assume at least two positions defining the mutual spacing. A special advantage of this configuration is that the clamp part is blocked in one of these positions by the locking part in such a way that it can no longer be displaced into the opening position for release from the profile rail.

According to a suitable feature of the coupling of the locking part to the clamp part, at least one of these two parts has a gripper arm, which engages a handle attachment of the other part in such a way that the maximum spacing between the two parts is defined thereby. The mutual spacing may, however, be reduced by displacing the two parts toward one another, counter to the spring force of a spring that spreads them apart, preferably a helical spring.

The various positions of the two parts relative to one another are defined by a plurality of stops, which are optionally formed by resilient detent means for changing position. In a first position, blocking the clamp part, the locking part is moved so close to the clamp part that it prevents its displacement into the opening position. This locking position of the fastening adaptor assures fastening of the housing to the profile rail in a manner that is secure against self-loosening, even under unfavorable conditions, such as strong vibrations.

In a second position, the spacing between the two parts is defined in such a way that the clamp part can be displaced into the opening position counter to the force of the spring that spreads the parts apart. This position thus corresponds in its action to known versions in which the housing must be pulled in one direction counter to the force of a spring in order to enable loosening of one of the two clamp parts from the top hat rail. However, that can be achieved only with the aid of a pivoting motion and the housing must be swiveled about the engagement point of the other clamp part.

However, in the case of profile rails secured directly to a wall, such swiveling motion cannot be carried out, so that according to a further feature of the invention, a third position is provided, in which the spacing between the two parts equals the maximum spacing defined by at least one gripper arm, so that by joint displacement of the two parts, the clamp part can be displaced into the opening position without overcoming a spring force. The clamp parts retracted on both sides then enable pivot-free removal of the housing from the profile rail.

According to a suitable feature of the invention, the clamp part has a V-beam which forms a clamping edge that engages the profile rail and a clamp body past which the V-beam protrudes on both sides, so that the beam shoulders located on the back side of the V-beam form a stop, which strikes the guide strip in the opening position.

A second stop, defining the closing position of the clamp part, can suitably form at least one slide hook, which engages an associated detent hole of the base plate of the rail holder when the clamp part is inserted into the guide grooves and in the clamping direction prevents the clamp part from undesirably sliding out of the guide grooves. The slide hooks rest in hook slots, which in turn are recessed out of the clamp body of the clamp part. A spring hole which is also provided in the clamp body serves the purpose of unilaterally supporting the spring disposed between the clamp part and the locking part.

It is advantageous to construct the locking part in such a way that it is slideably movable in the guide grooves with guide rails, in a manner corresponding to the clamp part, and it has the gripper arms needed for coupling to the clamp part. The gripper arms have an end secured to the slide body, on which they are provided with gripper arm shoulders, that prevent the locking part from sliding out of the guide groove in the opening direction, together with a groove stop formed in each guide groove.

In order to enable anchoring of the locking part in different detent positions, the locking part has a resilient locking tab that is disposed in a manner capable of oscillating in a tab slot. The locking tab is provided with at least one detent tooth, which engages a detent depression and strikes a stop edge. On the free end of the locking tab, an actuating rib is provided, which enables access of such a type that the locking tab is freed from its stop position, counter to its spring force, and thus enables displacement of the locking part.

It is especially advantageous for the locking part also to be constructed in such a way that in the third position of the two parts, it protrudes with its free end past the end of the rail holder and thus past the bottom surface of the housing body as well and in this position offers the possibility of performing a screw fastening of the housing, through suitable holes provided in the locking part.

Other features which are considered as characteristic for the invention are set forth in the appended claims.

Although the invention is illustrated and described herein as embodied in a housing suitable for wall or bottom fastening, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 4 is a lateral-sectional view of a housing body without the fastening apparatus;

FIG. 5 is a bottom-plan view of the housing body of FIG. 4;

FIG. 6 is another lateral-sectional view the housing body;

FIG. 7 is a plan view of the outside of a bottom half;

FIG. 8 is a lateral view of the bottom half of FIG. 7, which is pivoted by 90°;

FIG. 9 is another lateral view in a section taken along the line B—B of FIG. 7, in the direction of the arrows;

Figure 1:
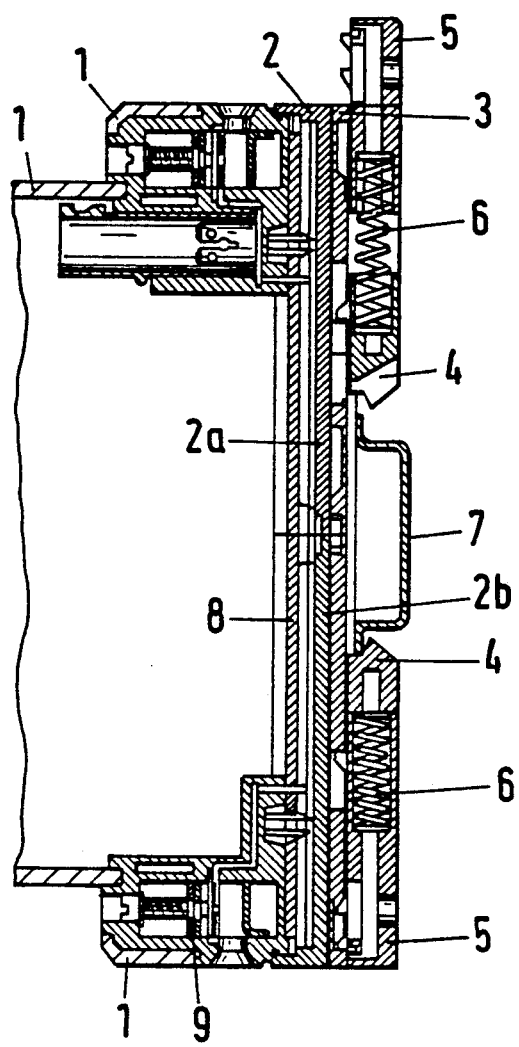
FIG. 1 is a fragmentary, diagrammatic, lateral-sectional view of a housing with a fastening apparatus.
Figure 2:
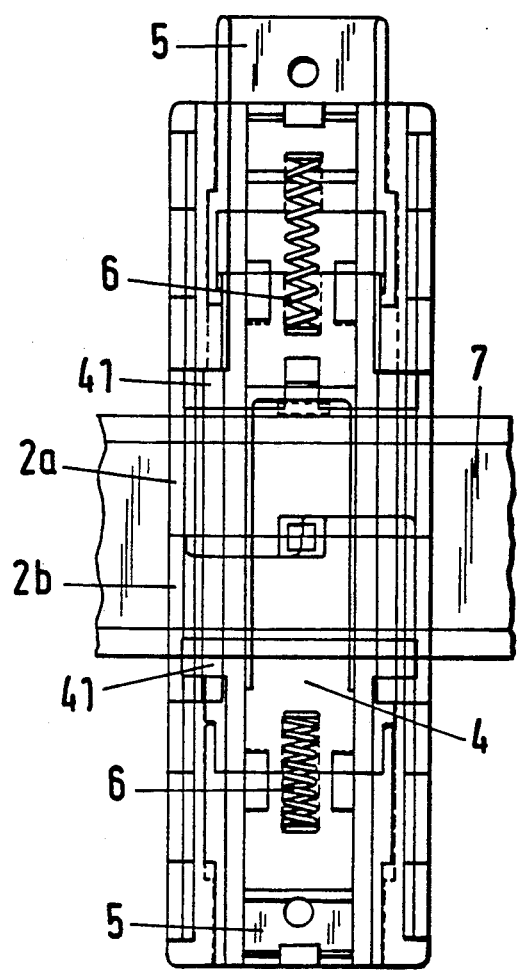
FIG. 2 is fragmentary, bottom-plan view of the housing of FIG. 1, with a view of the fastening apparatus.
Figure 3:
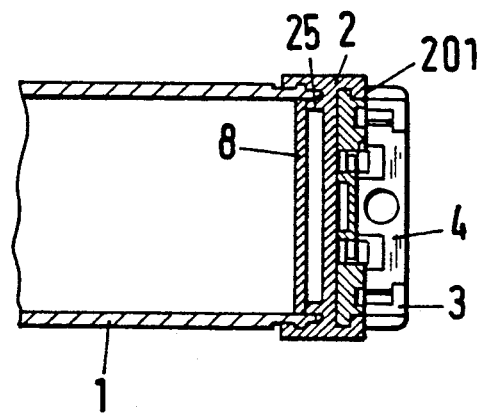
FIG. 3 is another fragmentary, lateral-sectional view of the housing of FIG. 1.
Figure 10:
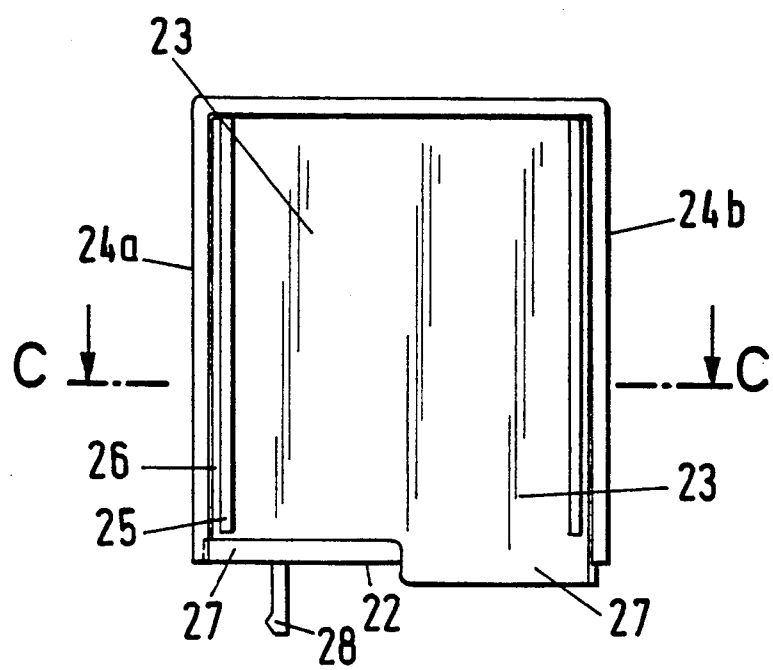
FIG. 10 is a plan view of the outside of a bottom half.

Referring now to the figures of the drawing in detail and first, particularly, to FIGS. 1-3 thereof, there is seen an equipment housing 1, 2, including a housing body 1 and a bottom part 2, which is equipped with a fastening adaptor 3-6, that is adapted to the type of wall or bottom fastening intended for the equipment housing 1, 2. In the present example, the fastening adaptor 3-6 is constructed in such a way that the equipment housing 1, 2 can be secured to a profile rail 7, which in this case is constructed as a top hat rail.

The housing body 1 serves to receive inserted printed wiring boards 8 and connection terminals 9, which require no further description herein because these details have no significance for the invention. An opening that makes it possible t insert the printed wiring boards 8 is located in the bottom region of the housing body 1, which is provided with one slide rail 11 shown in FIGS. 4-6 that points outward on each of the free ends of two opposed housing walls 12, and which enables two identical parts or halves 2a and 2b of the bottom part 2 to be slipped on.

The bottom part shown in FIGS. 7-11 creates a prerequisite for assuring that on one hand the fastening adaptor 3-6 needed to fasten the equipment housing 1, 2 can be easily attached to the equipment housing 1, 2, and on the other hand that the housing 1, 2 can be opened simply. Corresponding to the slide rails 11 on the housing body 1, the shell-like bottom part 2 is provided with one slide groove 21 in the inner surface of each of two opposed side wall parts 24a, 24b of a side wall 24. A guide rail 25 is disposed on a bottom wall 23 parallel to each side wall 24 and between these side walls. The guide rail 25 provides good lateral stability of the side walls that slide in a running groove 26 of the housing body 1, so that the side walls cannot be pressed inward. Due to the inter-engagement of grooves and rails, a meandering sealing edge is created between the housing body 1 and the bottom part 2, which assures good sealing against the entry of dust.

In the region of an abutting edge 22 of the two bottom parts 2 with which they meet the housing body 1 upon being slipped on, they have two overlapping tongues 27, which are offset relative to one another and extend as far as the middle of the bottom part 2. When the tongues 27 meet, they overlap one another and together make up a wall thickness equivalent to that of the remaining bottom wall 23. In the region of the abutting edge 22, each of the bottom parts 2 also has one detent hook 28 and one detent bearing surface 29 serving to anchor it. When the two bottom parts 2 are joined, these detent elements intermesh and hold the bottom parts together.

Figure 11:
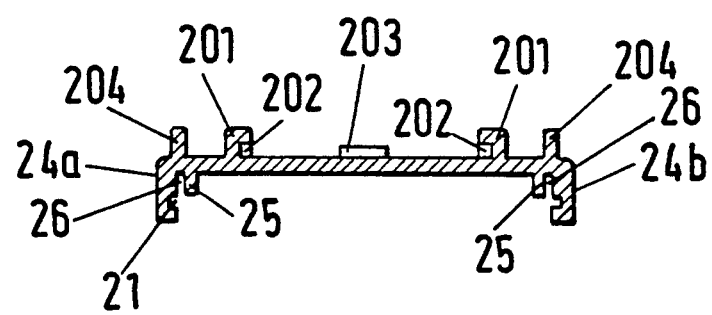
FIG. 11 is a lateral-sectional view of the bottom half, taken along the line C—C of FIG. 10, in the direction of the arrows.
Figure 13:
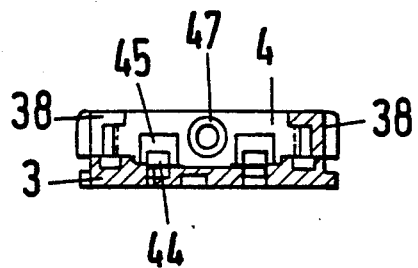
FIG. 13 is a lateral-sectional view of the fastening adaptor.
Figure 16:
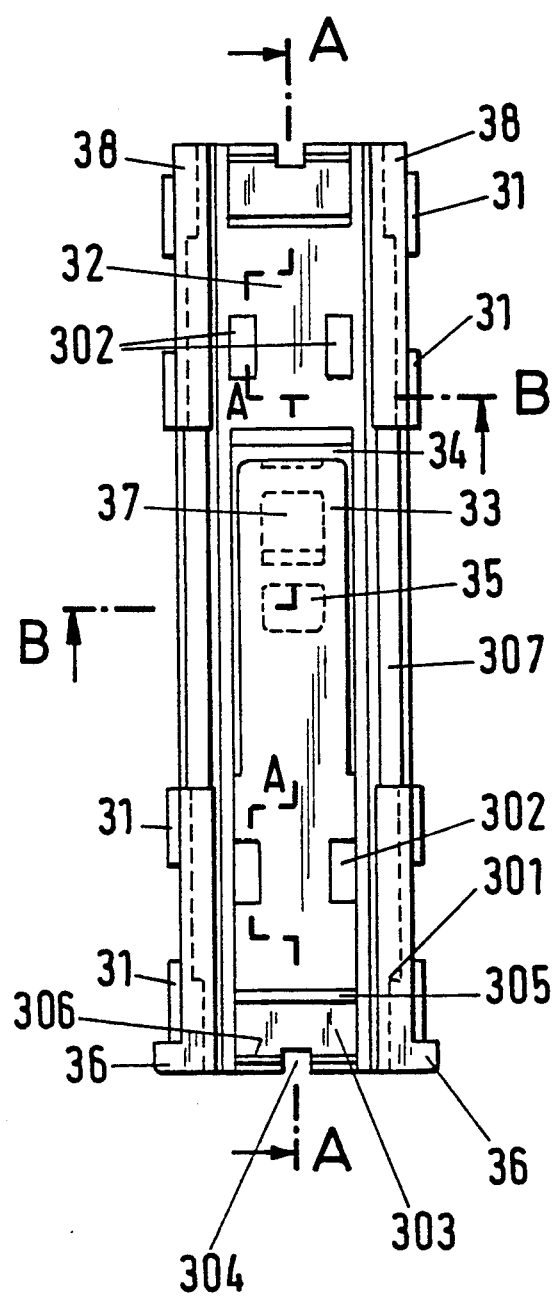
FIG. 16 is a plan view of the inside of the rail holder facing toward the housing.
Figure 17:
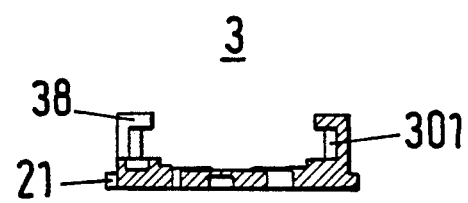
FIG. 17 is a lateral-sectional view of the rail holder taken along the line B—B of FIG. 16, in the direction of the arrows.
Figure 18:
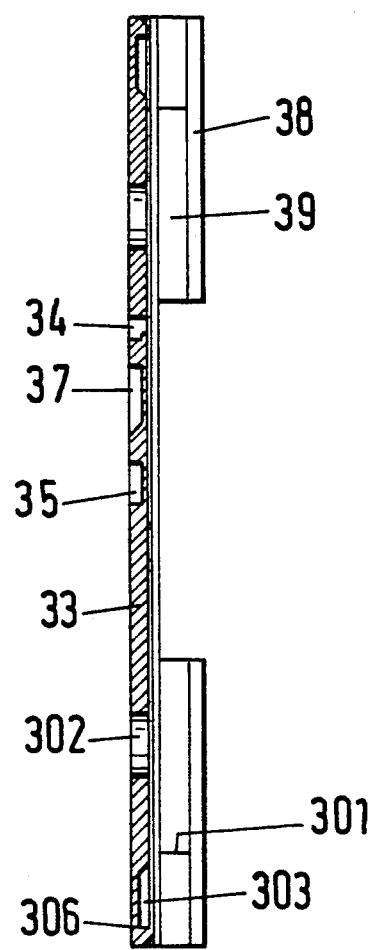
FIG. 18 is another lateral-sectional view of the rail holder arrows.
Figure 19:
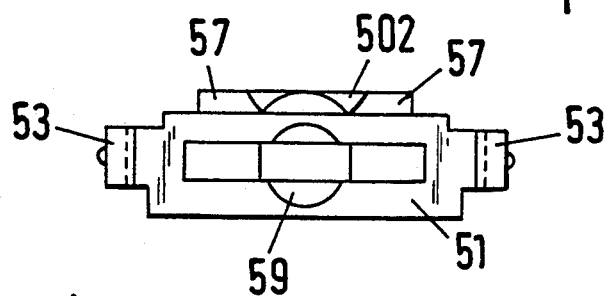
FIG. 19 is a lateral view of a locking part.
Figure 20:
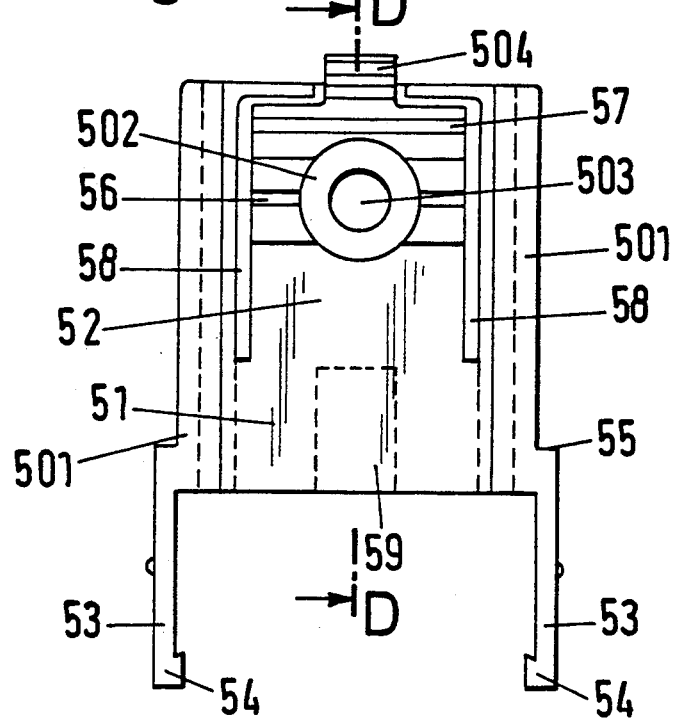
FIG. 20 is a plan view of the inside of the locking part facing toward the housing.
Figure 22:
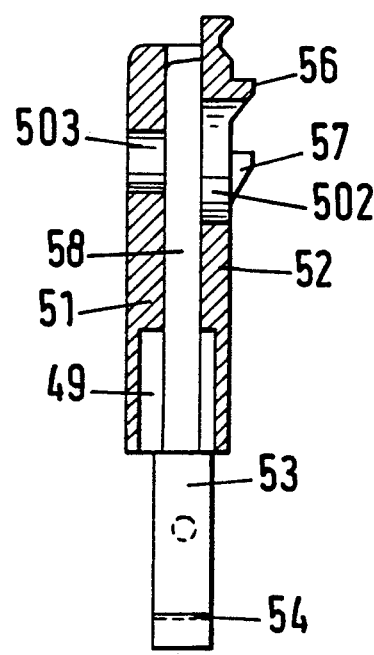
FIG. 22 is a further lateral-sectional view of the locking part.
Figure 21:
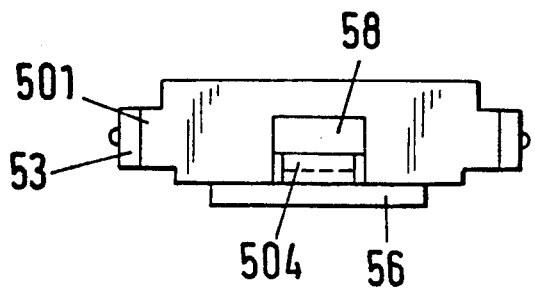
FIG. 21 is another lateral view of the locking part.

In order to mount the fastening adaptor 3-6 on the joined bottom parts 2, retaining tangs 201 are provided on both sides of the outside of these bottom parts facing away from the housing body 1, as seen in FIGS. 7 and 11. These tangs serve to form opposed retaining grooves 202, for receiving slide cams 31 shown in FIG. 12, which are part of the fastening adaptor 3-6. Like the retaining tangs 201, the slide cams 31 are spaced apart from one another on a base plate 32 shown in FIG. 16, which is part of a rail holder 3, so that they can find space in remaining gaps in a complementary part formed of the bottom part 2 and the rail holder 3. Upon connection of the fastening adaptor 3-6 to the bottom parts 2, the adaptor is first mounted vertically on the bottom parts 2. Retaining cams 203 and the slide cams 31 enter the respective gaps and are then displaced toward one another parallel to the plane of the bottom parts 2 in such a way that the slide cams 31 slide into the associated retaining grooves 202.

In the base plate 32 of the rail holder 3 of FIGS. 1-3, which is shown in more detail in FIGS. 15-18, a recess 34 is provided in which a spring tab 33 rests. Upon insertion of the fastening adaptor 3-6, the spring tab 33 locks into place with an indentation 35 thereof on the retaining cams 203, one of which is formed onto each abutting edge 22 of the bottom part 2. Since the indentation 35 engages the retaining cams 03 of both bottom parts 2, there is additional security in terms of the bottom parts being held together. The detent latching of the retaining cams 203 is made easier because the indentation 35 is preceded by a slide depression 37, in which the retaining cams 203 first find space as the fastening adaptor 3-6 is slipped on, and out of which they slide to the indentation 35 by raising of the spring tab 33. The spring tab 33, which is locked into place in detent fashion, can also be unlocked by being raised with a tool, in order to loosen the rail holder 3.

The thus conveniently interchangeable, or replaceable, fastening adaptor 3-6, in its present embodiment for profile rail fastening, not only has the rail holder 3 but also two opposed locking parts 5, two opposed clamp parts 4 and a spring 6 disposed between the two parts 4, 5, which are shown in FIGS. 1-3. The two opposed locking parts 5 are shown in more detail in FIGS. 19-22 and the two opposed clamp parts 4 are shown in more detail in FIGS. 23-25.

In order to fasten the two parts 4, 5 to the rail holder 3, two guide strips 38 are formed onto the outer surface of the rail holder 3 facing away from the housing body 1, which are located on both sides facing one another in the region of the two ends of the rail holder 3. Guide grooves 39 are recessed into the guide strips and in turn receive first guide rails 46 of the clamp part 4 and second guide rails 501 of the locking part 5.

Figure 23:
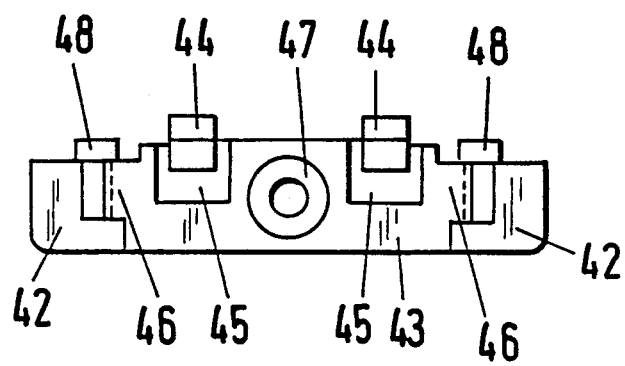
FIG. 23 is a lateral view of a clamp part.
Figure 24:
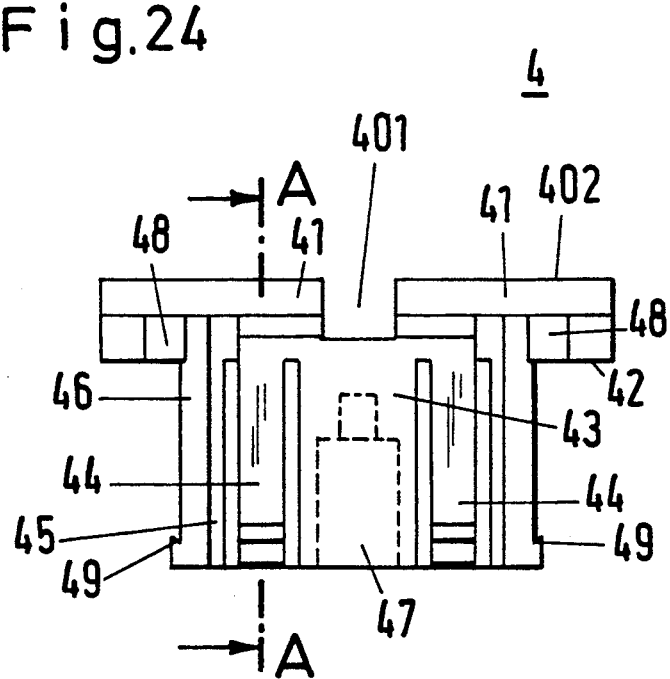
FIG. 24 is a plan view of the inside of the clamp part facing toward the housing.
Figure 25:
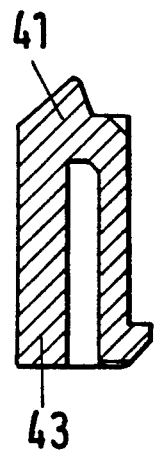
FIG. 25 is a lateral-sectional view of the clamp part taken along the line A—A of FIG. 24, in the direction of the arrows.

The clamp part 4 shown in FIGS. 23-25 have a clamp body 43, on both sides of which the first guide rails 46 are provided, and the clamp body is preceded in the clamping direction by a V-beam 41, which engages the profile rail 7 with a clamping edge 402 thereof that has a recess 401. The V-beam 41, which protrudes past the clamp body 43 on both sides, has beam shoulders 42 on its back which act as a stop against the guide strips 38, to limit the opening spacing between the two clamp parts 4. A closing spacing that defines the closing and sealing position of the two clamp parts 4 is limited by a further stop that is brought about by two slide hooks 44 which rest inside a hook slot 45 recessed in the clamp body 43. These slide hooks 44 engage detent holes 302 in the rail holder 3 that have a length which determines the maximum sliding travel of the clamp part 4 in the clamping direction. Two guide tangs 48 formed onto the V-beam 41 fit into tang grooves 307 in the rail holder 3 and serve to stabilize guidance.

The locking part 5 shown in FIGS. 19-22 is slidingly joined to the clamp part 4 by means of two gripper arms 53 formed onto both sides of a slide body 51. Located on the free end of each gripper arm 53 is one gripper hook 54, which holds onto a handle attachment 49 of the clamp part 4 and as a result determines the maximum spacing between the two parts 4, 5. The locking part 5, which is inserted from the middle of the rail holder 3 between the guide strips 38 counter to the clamping direction, has a gripper arm shoulder 55 on the other end of each gripper arm 53. With these shoulders 55, the gripper arms 53 strike a groove stop 301, so that it cannot slide out of the slide rails 11 at the end of the rail holder 3.

A tab slot 58 is recessed in the slide body 51 of the locking part 5, and resilient detent means in the form of a locking tab 52 rests in this slot with a first detent tooth 56 and a second detent tooth 57. With the aid of the two detent teeth 56, 57, which engage an associated detent depression 303 recessed in the base plate 32 of the rail holder 3 and which are supported on a stop edge 306, the locking parts 5 can assume three different positions with respect to the clamp part 4.

Figure 12:
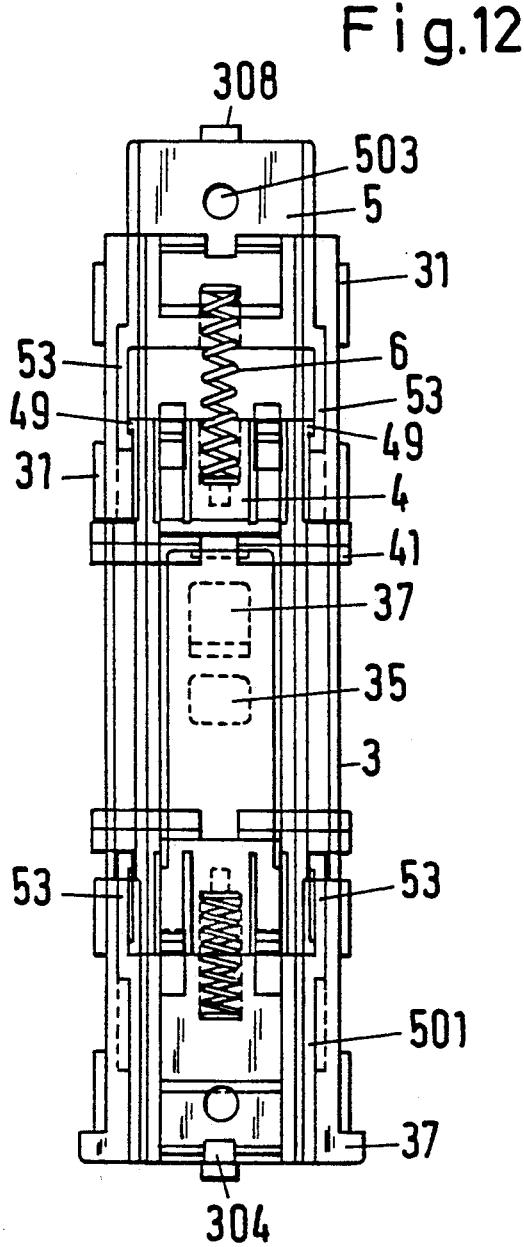
FIG. 12 is a plan view of a completely assembled fastening adaptor.
Figure 14:
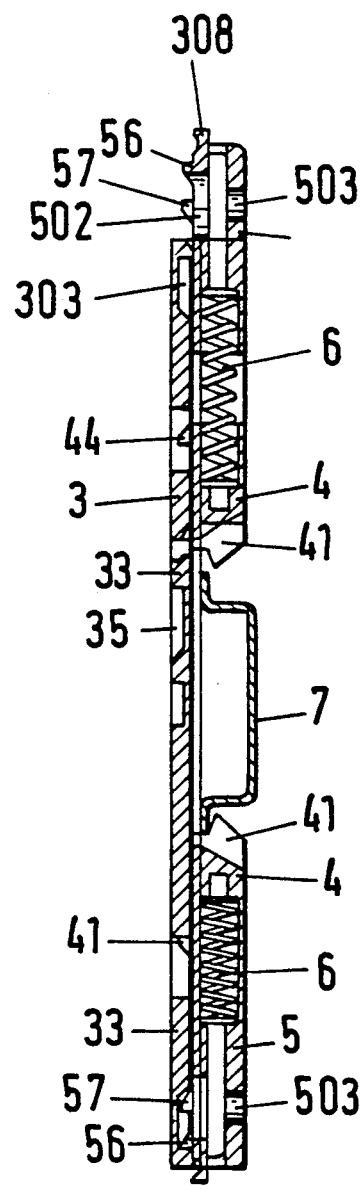
FIG. 14 is another lateral-sectional view of the fastening adaptor.
Figure 15:
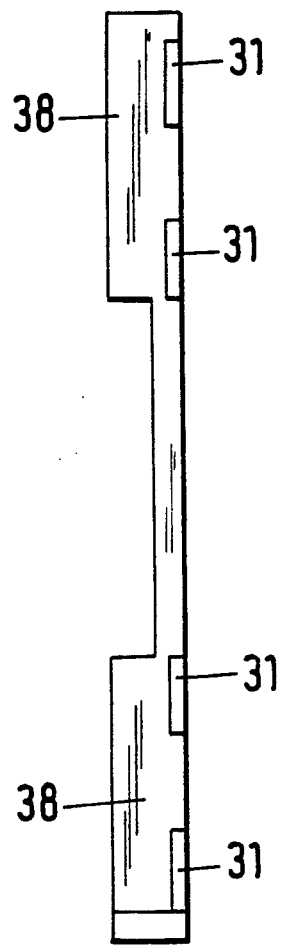
FIG. 15 is a side-elevational view of a rail holder.

In a first position, which is shown in the lower part of FIGS. 12 and 14, the locking part 5 is moved so close to the clamp part 4 that the latter is locked in its clamping position. The first detent tooth 56 in this position ha become anchored on the stop edge 306, and the spring 6 located between the two parts 4, 5, which is in a spring hole 47 of the clamp part 4 and in a spring chamber 59 of the locking part 5, is compressed to its maximum extent. The locking assures that the clamping apparatus of the fastening adaptor 3—6 cannot open even in the presence of severe vibration, for instance originating in a system, and thus that the equipment housing 1, 2 remains securely joined to the profile rail 7.

In a second non-illustrated position, the second detent tooth 57 has become anchored on the stop edge 306. In this case the spring 6 is only partly compressed, so that the possibility exists of removing the equipment housing 1, 2 from the profile rail 7, by pulling on the housing 1, 2 in the opening direction of a first part of the clamp part 4, counter to the force of the spring 6 of a second part of the clamp part 4, and by means of a swiveling motion of the housing 1, 2. However, if a top hat rail is secured directly to a wall, this cannot be done successfully, because there is no space for the requisite pivoting motion of the equipment housing 1, 2.

A third position of the locking part 5, which is shown in the upper part of FIGS. 12 and 14, is therefore provided. In that position, the locking part 5 can be pulled out of the guide strips 38 until it strikes the gripper arm shoulder 55, so that the two parts 4, 5 attain their maximum spacing from one another, which is defined by the location where they meet the gripper hooks 54. The spring 6 assures that the two parts 4, 5 are kept spaced apart and can be pulled jointly into the open position, so that without overcoming a spring force, the equipment housing 1, 2, in this open position, can be removed from the top hat rail perpendicularly to the wall.

In the open position, the two locking parts 5 protrude beyond the equipment housing 1, 2 far enough to ensure that since they are provided with corresponding holes 502, 503, they afford the possibility of a screw fastening. The hole 502 is a larger head hole that is recessed from the locking tab 52 and allows the passage of a screw head through it, which rests above the hole 503 which is a smaller screw hole in the slide body 51. In order to release the locking tab 52 from one of its clamping positions, this tab can be lifted by a suitable tool, such as a screwdriver, which is made easier by an actuation opening 304 and an actuation rib 504. In order to remove the locking part 5, this part can be pulled out of the guide strips 38 in the clamping direction, in the course of which the detent teeth 56, 57 slide out of the detent depression 303 over a slide edge 305.

The same fastening adaptor 3-6 can be used in combination with housings having widths that are approximately that of the fastening adaptor 3-6, as well as with those that are substantially wider. In order to prevent wider housings, which only partly rest on the fastening adaptor 3-6, from being torn out of their anchoring by laterally exerted forces, the associated bottom parts 2 are provided on both sides with support ribs 204, with which they can be supported on the corresponding wall or bottom surface. If the equipment housing 1, 2 is mounted on a wall, the rail holder 3 is also provided on its lower end with retaining feet 36, on which the applicable bottom part 2 can be supported with the retaining tangs 201. As a result, the weight of the equipment housing 1, 2 need not be supported by the spring tab 33.

We claim:

1. An electrical system equipment housing for fastening to a wall or bottom surface, comprising a substantially parallelepiped housing body, a bottom part being secured to said housing body and having an outer surface, a replaceable or interchangeable fastening adaptor being adapted to an intended type of wall or bottom fastening, and retaining elements formed on said outer surface of said bottom part for enabling said fastening adaptor to be slipped on; wherein said bottom part includes two bottom halves being slipped onto said housing body from two opposite sides and meeting one another in the middle of said bottom part with abutting edges; and wherein said bottom part has bottom walls and two side walls forming a flat shell shape, said bottom part has housing walls with ends, said bottom part is opened on one side for slipping on only when separated into said two bottom halves, said interengaging side elements are disposed in sliding direction and on corresponding outer surfaces of said housing body for effecting a meandering sealing of the equipment housing.

2. The housing according to claim 1, wherein said retaining elements and said said bottom part are formed of the same material.

3. The housing according to claim 1, wherein said housing body and said bottom part have respective interengaging slide rails and slide grooves, for slipping said bottom part onto said housing body from at least one side of the housing and for fastening said bottom part to said housing body.

4. The housing according to claim 1, wherein said bottom part has guide rails parallel to said two side walls disposed in the sliding direction, forming a running groove for said ends of said two associated housing walls.

5. The housing according to claim 1, wherein said associated bottom walls overlap in the vicinity of said abutting edges of said two bottom halves.

6. The housing according to claim 7, wherein said bottom walls each have an overlapping tongue in the region of a respective one of said abutting edges, said tongues have half the width and half the wall thickness of said bottom wall and are mutually offset in stages, and two of said overlapping tongues with half wall thicknesses meet and overlap to form the wall thickness of said bottom wall.

7. The housing according to claim 1, wherein said bottom halves have outer surfaces with said retaining tangs formed thereon along the sliding direction thereof, said bottom halves have retaining grooves between said retaining tangs and said bottom walls, and said fastening adaptor has a rail holder with slide cams formed thereon resting in said retaining grooves.

8. The housing according to claim 7, wherein said retaining tangs and said slide cams are mutually spaced apart by a distance, said slide cams are disposed in a space between said retaining tangs and said rail holder is fastened to said bottom part by a displacement parallel to a plane of said bottom wall in said retaining grooves up to a stop with simultaneous locking, in a joining process taking place at right angles to the plane of said bottom wall.

9. The housing according to claim 7, including a spring tab for locking said rail holder secured to said bottom part in a basic position, said rail holder having a base plate with a recess formed therein in which said spring tab is exposed, said spring tab having an indentation formed therein, said bottom halves each having a retaining cam being formed thereon in the vicinity of said abutting edge and protruding past the plane of said bottom wall for dipping into said indentation, and said indentation holding said associated bottom halves together by engaging said retaining cams.

10. The housing according to claim 9, wherein said base plate of said rail holder has an outer surface facing away from the housing, said outer surface has two ends, and including guide strips each being disposed at a respective one of said ends of said outer surface in the sliding direction, said guide strips being bent at an angle toward the inside and forming two opposed guide grooves with said base plate, a clamp part, a first guide rail) disposed in said guide grooves on said clamp part, a locking part, and a second guide rail disposed in said guide grooves on said locking part.

11. The housing according to claim 10, wherein said clamp part detachably fastens the housing to a profile rail by engaging the profile rail on both sides in tonglike fashion, said clamp part is held in a clamping position by spring force acting in a given direction and is displaceable into an open position for detachment counter to said given direction, said locking part and said clamp part are displaceable toward one another and relative to said rail holder, said locking part and said clamp part are coupled to one another for assuming at least two positions defining a mutual spacing, and said locking part blocks said clamp part in one of said positions for preventing said clamp part from being displaced into said open position for detachment from the profile rail.

12. The housing according to claim 11, including a spring exerting a force in a biasing direction for spreading said locking part and said clamp part apart, for coupling said locking part and said clamp part together, one of said parts having at least one gripper arm and the other of said parts having a handle attachment being engaged by said at least one gripper arm for defining a maximum spacing between said parts, being reduced only by displacement of said clamp part and said locking part toward one another counter to said biasing direction.

13. The housing according to claim 12, including stops defining said positions of said clamp part and said locking part relative to one another, said stops being resilient detent means for varying position, and said locking part being moved so close to said clamp part in a first position in which said clamp part is blocked, that said locking part blocks displacement of said clamp part into said open position.

14. The housing according to claim 13, wherein in a second position, said spacing between said clamp part and said locking part permits said clamp part to be displaced into said open position counter to the force of said spring that spreads said clamp part and said locking part apart.

15. The housing according to claim 14, wherein in a third position, said spacing between said clamp part and said locking part is equivalent to said maximum spacing between said clamp part and said locking part defined by said at least one gripper arm, and in said third position said clamp part can be displaced into said open position without overcoming a spring force, by joint displacement of said clamp part and said locking part.

16. The housing according to claim 12, wherein said clamp part has a clamp body disposed between said guide strips, and a V-beam with a prismatic shape forming a clamping edge engaging the profile rail and protruding on two ends past said clamp body, and said V-beam has a back surface with beam shoulders forming a stop resting on an associated end of said guide strips in said open position.

17. The housing according to claim 16, wherein said V-beam has a recess formed therein.

18. The housing according to claim 16, wherein said first guide rail enables a sliding motion in said guide grooves between said guide strips, and said clamp part has a stop forming at least one slide hook for limiting the sliding motion, said at least one slide hook engaging a detent hole formed in said base plate of said rail holder upon insertion of said clamp part into said guide grooves, and preventing an undesired slide out of said guide grooves in a clamping direction.

19. The housing according to claim 18, wherein said clamp body has hook slots recessed therein for freeing said slide hooks, and said clamp body has a spring hole formed therein for receiving one end of said spring disposed between said clamp part and said locking part.

20. The housing according to claim 16, wherein said handle attachment is formed on said clamp body, and said handle attachment is engageable by said at least one gripper arm.

21. The housing according to claim 20, wherein said handle attachment is disposed in the vicinity of said first guide rail.

22. The housing according to claim 12, including groove stops each being disposed in a respective one of said guide grooves, said locking part having another guide rail, said two guide rails being disposed slidingly in said guide grooves corresponding to said clamp part, said at least one gripper arm for coupling to said clamp part having an end facing toward said clamp part with gripper hooks and an end secured to said slide body with gripper arm shoulders, and said gripper arm shoulders together with said groove stops preventing said locking part from sliding out of said guide groove in an opening direction.

23. The housing according to claim 10, including a stop edge, said at least one locking part having a resilient locking tab being rockingly disposed in a tab slot, and having a free end, a stop position and a spring force, said tab having at least one detent tooth engaging a detent depression and striking said stop edge, and an actuating rib disposed on said free end of said locking tab and permitting access for freeing said locking tab from said stop position counter to said spring force for enabling a new displacement of said at least one locking part.

24. The housing according to claim 19, wherein said housing body has a bottom surface, said locking part has a free end protruding past an end of said rail holder and past the bottom surface of s id housing body in the third position of said clamp part and said locking part, for selectively securing said housing body to a wall and to a bottom surface without a profile rail, in the third position of said clamp part and said locking part, and said slide body has a side facing toward said clamp part with a spring chamber formed therein for receiving another end of said spring.

25. The housing according to claim 24, wherein said locking part has corresponding holes formed therein for securing said housing body.

26. An electrical system equipment housing for fastening to a wall or bottom surface, comprising a substantially parallelepiped housing body, a bottom part being secured to said housing body and having an outer surface, a replaceable or interchangeable fastening adaptor being adapted to an intended type of wall or bottom fastening, and retaining elements formed on said outer surface of said bottom part for enabling said fastening adaptor to be slipped on; wherein said bottom part includes two bottom halves being slipped onto said housing body from two opposite sides and meeting one another in the middle of said bottom part with abutting edges; wherein each of said two bottom halves have a detent hook and a detent bearing surface for anchoring said detent hooks in the vicinity of a respective one of said abutting edges, and said detent hooks and detent bearing surfaces enable a self-holding connection of said two bottom halves.

* * * * *